United States Patent
Hasenfang et al.

(10) Patent No.: US 7,933,580 B2
(45) Date of Patent: Apr. 26, 2011

(54) EMERGENCY SERVICES FOR VOICE OVER IP TELEPHONY (E-VOIP)

(76) Inventors: Dennis J. Hasenfang, Waterford, WI (US); Christopher C Willis, Naperville, IL (US)

( * ) Notice: Subject to any disclaimer, the term of this patent is extended or adjusted under 35 U.S.C. 154(b) by 1022 days.

(21) Appl. No.: 11/500,135

(22) Filed: Aug. 7, 2006

(65) Prior Publication Data

US 2007/0058615 A1 Mar. 15, 2007

Related U.S. Application Data

(60) Provisional application No. 60/706,088, filed on Aug. 5, 2005.

(51) Int. Cl.
*H04M 11/04* (2006.01)

(52) U.S. Cl. .................. 455/404.2; 455/456.1; 455/41.2; 370/352; 379/45

(58) Field of Classification Search .............. 455/404.2, 455/456.1; 379/45; 340/572.1; 370/352–356, 370/328, 329, 338; 701/207; 342/357.07
See application file for complete search history.

(56) References Cited

U.S. PATENT DOCUMENTS

| | | | |
|---|---|---|---|
| 6,799,049 B1 * | 9/2004 | Zellner et al. ............... 455/456.1 |
| 6,831,563 B1 | 12/2004 | Contractor |
| 6,868,074 B1 | 3/2005 | Hanson |
| 6,927,727 B2 * | 8/2005 | Cleghorn ................... 342/357.4 |
| 6,940,950 B2 * | 9/2005 | Dickinson et al. ............. 379/45 |
| 7,149,499 B1 * | 12/2006 | Oran et al. ................ 455/404.2 |
| 7,194,354 B1 * | 3/2007 | Oran et al. .................... 701/207 |
| 7,257,387 B2 * | 8/2007 | Laliberte .................... 455/404.1 |
| 7,260,186 B2 * | 8/2007 | Zhu et al. ......................... 379/45 |
| 7,260,378 B2 * | 8/2007 | Holland et al. ............. 455/404.2 |
| 7,639,792 B2 * | 12/2009 | Qiu et al. .................. 379/207.15 |
| 7,653,374 B2 * | 1/2010 | Mehio et al. ................ 455/404.1 |
| 7,697,942 B2 * | 4/2010 | Stevens ....................... 455/456.1 |
| 7,739,402 B2 * | 6/2010 | Roese et al. ................... 709/242 |
| 7,756,253 B2 * | 7/2010 | Breen et al. ...................... 379/45 |
| 7,809,381 B2 * | 10/2010 | Aborn et al. ............... 455/456.5 |
| 7,848,733 B2 * | 12/2010 | Bull et al. .................. 455/404.2 |
| 2002/0101818 A1 | 8/2002 | Teixeira |
| 2003/0063714 A1 | 4/2003 | Stumer et al. |
| 2003/0086539 A1 | 5/2003 | McCalmont et al. |
| 2003/0225893 A1 | 12/2003 | Roese et al. |
| 2004/0057425 A1 | 3/2004 | Brouwer et al. |
| 2004/0140928 A1 * | 7/2004 | Cleghorn ................. 342/357.07 |
| 2004/0151283 A1 | 8/2004 | Lazoff |
| 2004/0203920 A1 | 10/2004 | Yoon |
| 2005/0048948 A1 | 3/2005 | Holland et al. |
| 2005/0063519 A1 | 3/2005 | James |
| 2005/0090225 A1 | 4/2005 | Muehleisen et al. |
| 2005/0105496 A1 * | 5/2005 | Ambrosino ................... 370/338 |
| 2005/0135569 A1 | 6/2005 | Dickinson et al. |
| 2005/0174991 A1 | 8/2005 | Keagy |
| 2005/0190892 A1 | 9/2005 | Dawson et al. |
| 2005/0213716 A1 | 9/2005 | Zhu et al. |
| 2005/0243973 A1 | 11/2005 | Laliberte |
| 2006/0106930 A1 * | 5/2006 | Shaffer ......................... 709/224 |
| 2006/0193447 A1 | 8/2006 | Schwartz |

(Continued)

Primary Examiner — Sharad Rampuria
(74) Attorney, Agent, or Firm — Henry C. Query, Jr.

(57) ABSTRACT

A method for determining the physical coordinates of a VoIP phone and transmitting the physical coordinates to an emergency services call center or the like comprises the steps of determining the physical coordinates of the VoIP phone using signals from a GPS or cellular network, placing a call to an emergency services call center using the VoIP phone, and automatically transmitting the physical coordinates of the VoIP phone to the emergency services call center.

18 Claims, 3 Drawing Sheets

U.S. PATENT DOCUMENTS

| | | |
|---|---|---|
| 2006/0252408 A1 | 11/2006 | Faccin et al. |
| 2006/0274729 A1* | 12/2006 | Self ............................... 370/352 |
| 2006/0293024 A1* | 12/2006 | Benco et al. ............... 455/404.2 |
| 2007/0032225 A1* | 2/2007 | Konicek et al. ............... 455/417 |
| 2007/0060097 A1* | 3/2007 | Edge et al. ................. 455/404.1 |
| 2008/0160953 A1* | 7/2008 | Mia et al. .................... 455/404.2 |
| 2010/0184401 A1* | 7/2010 | Spence ....................... 455/404.2 |
| 2010/0311385 A1* | 12/2010 | Hurwitz ..................... 455/404.1 |

* cited by examiner

EMERGENCY SERVICES FOR VOICE OVER IP TELEPHONY (E-VOIP)

This application is based on U.S. Provisional Patent Application No. 60/706,088, which was filed on Aug. 5, 2005.

BACKGROUND OF THE INVENTION

The present invention relates to voice over internet protocol ("VoIP") telephony systems. More particularly, the invention relates to a system for providing emergency services to users of VoIP phones.

The implementation of emergency services for users of the Plain Old Telephone System ("POTS") is fairly straightforward. Each telephone in the POTS is identified with a single user and address. Thus, when a user dials 9-1-1, or any applicable emergency number, the user's name and address are automatically transmitted to the Emergency Services 911 Call Center and the 911 operator can dispatch the proper authorities to this address.

In contrast, the implementation of Emergency services in VoIP telephony systems is not as reliable. A VoIP phone can be used in practically any location which offers internet access. Therefore, the VoIP phone may be used not only from a user's home or office, but also from any of the user's travel destinations.

One system for providing Emergency services to users of VoIP phones requires the provider of the VoIP service to maintain a database of the names and addresses of its users. Thus, when a user dials 9-1-1, his name and address will be transmitted to the Emergency Services 911 Call Center. However, if the user is using the VoIP phone from other than this address, his current location will not be transmitted to the Emergency Services 911 Call Center. In this event, the 911 operator will not be able to determine the user's location unless the user is able to communicate this information verbally. Moreover, if the user cannot communicate his location to the 911 operator, the operator may dispatch the authorities to the address stored in the database, which will obviously not help the user.

SUMMARY OF THE INVENTION

In accordance an embodiment of the present invention, these limitations are overcome by providing an emergency services location detection system which comprises Global Positioning System ("GPS") or cellular technology to determine the current location of the VoIP phone. Thus, when a user dials 9-1-1, or any applicable emergency number, the emergency services location detection system will determine the current location of the VoIP phone and send this information to the Emergency Services 911 Call Center to allow the 911 operator to properly identify the location from where the call has been placed.

The emergency services location detection system of the present invention may be integrated into the VoIP phone or constructed as a separate device which can be connected to a conventional VoIP phone. In addition, the emergency services location detection system may comprise cellular technology, such as Global System for Mobile Communications ("GSM"), General Packet Radio Service ("GPRS") or (Code Division Multiple Access ("CDMA"), to allow the VoIP phone to access the Emergency Services 911 Call Center in the event the VoIP service is unavailable.

These and other objects and advantages of the present invention will be made apparent from the following detailed description, with reference to the accompanying drawings.

DETAILED DESCRIPTION OF THE INVENTION

The present invention is directed to a system for providing emergency services to users of VoIP phones (the "E-VoIP system"). The E-VoIP system employs either GPS or cellular technology to determine the physical coordinates of the VoIP phone. When a caller uses the VoIP phone to dial 9-1-1, or any other such emergency number, the E-VoIP system transmits the physical coordinates of the VoIP phone to the Emergency Services 911 Call Center. Thus, the 911 operator is able to locate the caller wherever the VoIP phone is being used.

Figure 1:
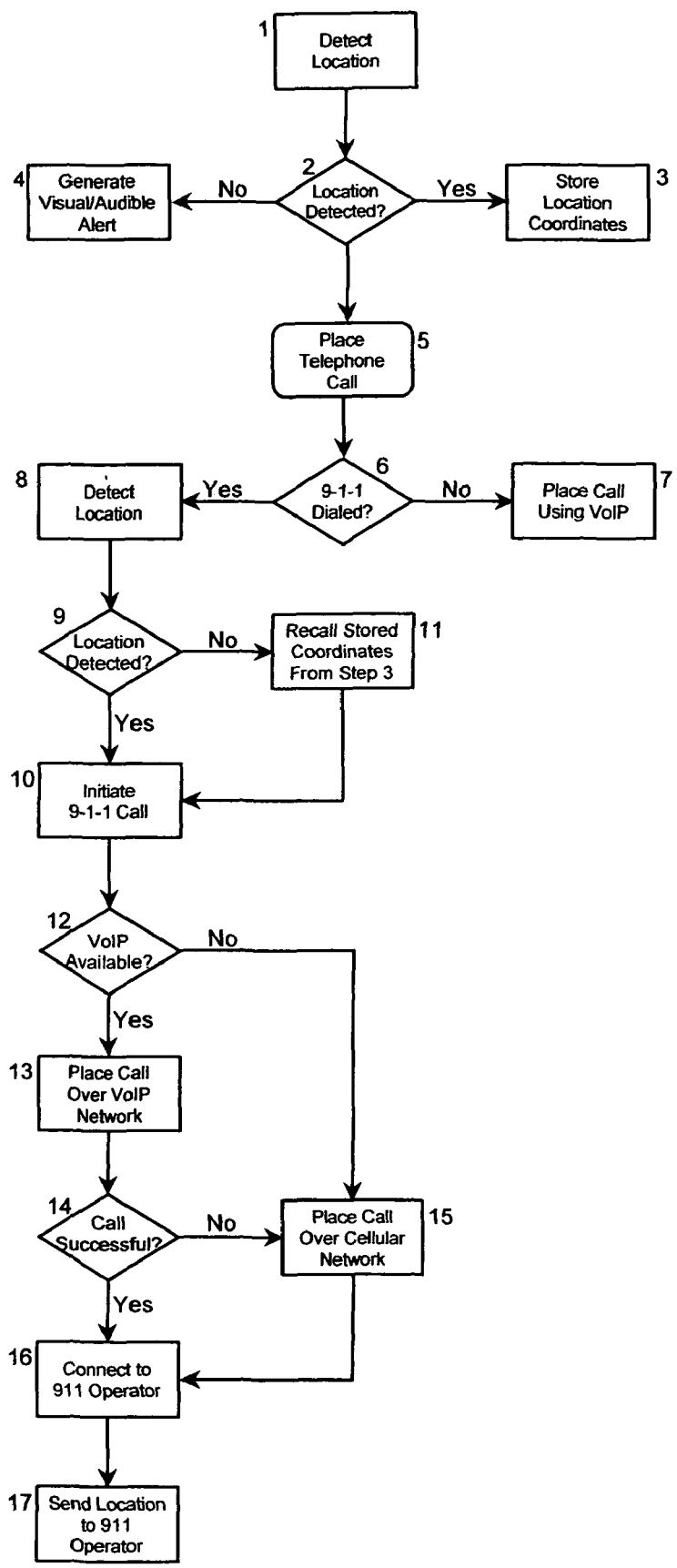
FIG. 1 is a flow chart illustrating an embodiment of an emergency services system of the present invention which is particularly useful for residential and small office settings.

The operation of one embodiment of the E-VoIP system of the present invention in the context of a residential setting is illustrated schematically in FIG. 1. The E-VoIP system employs either conventional GPS tracking technology or, for example, CDMA or GSM cellular technology, to determine the physical coordinates of the VoIP phone using existing triangulation techniques. In either case, when the VoIP phone is activated the E-VoIP system will search for an available GPS or cellular network and attempt to determine the physical coordinates of the phone (step 1). If the E-VoIP system is able to detect the physical coordinates of the phone (step 2), the E-VoIP system will store these coordinates in an associated memory for later use (step 3), as will be discussed below. This operation is ideally performed continuously at predefined time intervals or in response to one or more predefined events in order to provide the E-VoIP system with the most up-to-date information regarding the physical location of the VoIP phone.

If the E-VoIP system is unable to determine the physical coordinates of the phone, the E-VoIP system will generate a visual and/or audible alert to notify the caller that the coordinates have not been determined (step 4). This will not affect the functionality of the VoIP phone or prevent the caller from placing a call. The alert will merely notify the caller that the E-VoIP system is not able to determine the physical coordinates of the phone and will prompt the caller to move to another location with better reception. Thus, whether or not the E-VoIP system is able to determine the physical coordinates of the VoIP phone, the E-VoIP system will allow the caller to place a call (step 5).

The E-VoIP system allows the VoIP phone to be used in the same manner as a conventional analog or VoIP phone. However, the E-VoIP system will also monitor the digits which the user enters to determine whether the standard emergency contact number 9-1-1 has been dialed (step 6). If a number other than 9-1-1 has been dialed, the E-VoIP system will allow the VoIP phone to place the call in the normal fashion (step 7).

However, if the E-VoIP system determines that the caller has dialed 9-1-1, the E-VoIP system will immediately attempt to determine the current physical coordinates of the VoIP phone through the GPS or cellular network (step 8). This will ensure that the E-VoIP system has the most current and accurate physical coordinates for the phone. If the E-VoIP system is able to determine the physical coordinates of the phone (step 9), the E-VoIP system will initiate the call to the Emergency Services 911 Call Center (step 10). If, however, the E-VoIP system is unable to immediately determine the physical coordinates of the VoIP phone through the GPS or cellular network, the E-VoIP system will recall the last coordinates which were stored in its associated memory (step 11). Since as described above the E-VoIP system continuously attempts to determine the physical coordinates of the phone in step 1 and then stores these coordinates in step 3, the E-VoIP system will always have relatively accurate coordinates for the phone, whether or not the E-VoIP system is able to immediately determine the exact coordinates through the GPS or cellular network in step 9. This feature is important to ensure that the E-VoIP system has relatively accurate coordinates for the E-VoIP phone in the even the phone is relocated often.

Once the current or last-stored physical coordinates of the VoIP phone have been determined, the E-VoIP system will initiate the call to the Emergency Services 911 Call Center (step 10). The E-VoIP system will first determine if the VoIP service to which the VoIP is connected is available (step 12). If it is, then the E-VoIP system will route the call over the VoIP network (step 13) and will monitor the call to determine if it has been successfully completed (step 14). If the call is successfully completed over the VoIP network, the E-VoIP system will connect the user to the Emergency Services 911 Call Center (step 16). However, if the E-VoIP system determines that the VoIP service is unavailable for any reason, such as a power loss or equipment failure, or that the call was not successfully completed over the VoIP network, the E-VoIP system will complete the call over the cellular network using the conventional E-911 system (step 15).

Once the call is connected to the Emergency Services 911 Call Center, the E-VoIP system will transmit the current or last-stored physical coordinates of the VoIP phone to the 911 operator (step 17). In one embodiment of the present invention, the E-VoIP system transmits the physical coordinates as part of a data packet which may also comprise the user's name, telephone number and the last time the physical coordinates were determined, among other information. This data packet is ideally capable of signaling the Internet routers and other network devices that it is a High Priority packet which should be placed at the beginning of all queues. This prioritizing mechanism is known as the Quality of Service (QoS) protocol, under which certain packets are sent before others due to the demand and time factors associated with such packets.

Once the call has been connected to the Emergency Services 911 Call Center, the physical coordinates of the VoIP phone are transmitted to the 911 operator, where they can be resolved with a corresponding street address using suitable means, such as a conventional mapping program. The 911 operator can then assist the caller in the usual fashion. Thus, the entire operation can be completed, and the caller's street address communicated, without the caller having to actually speak with the 911 operator.

Figure 2:
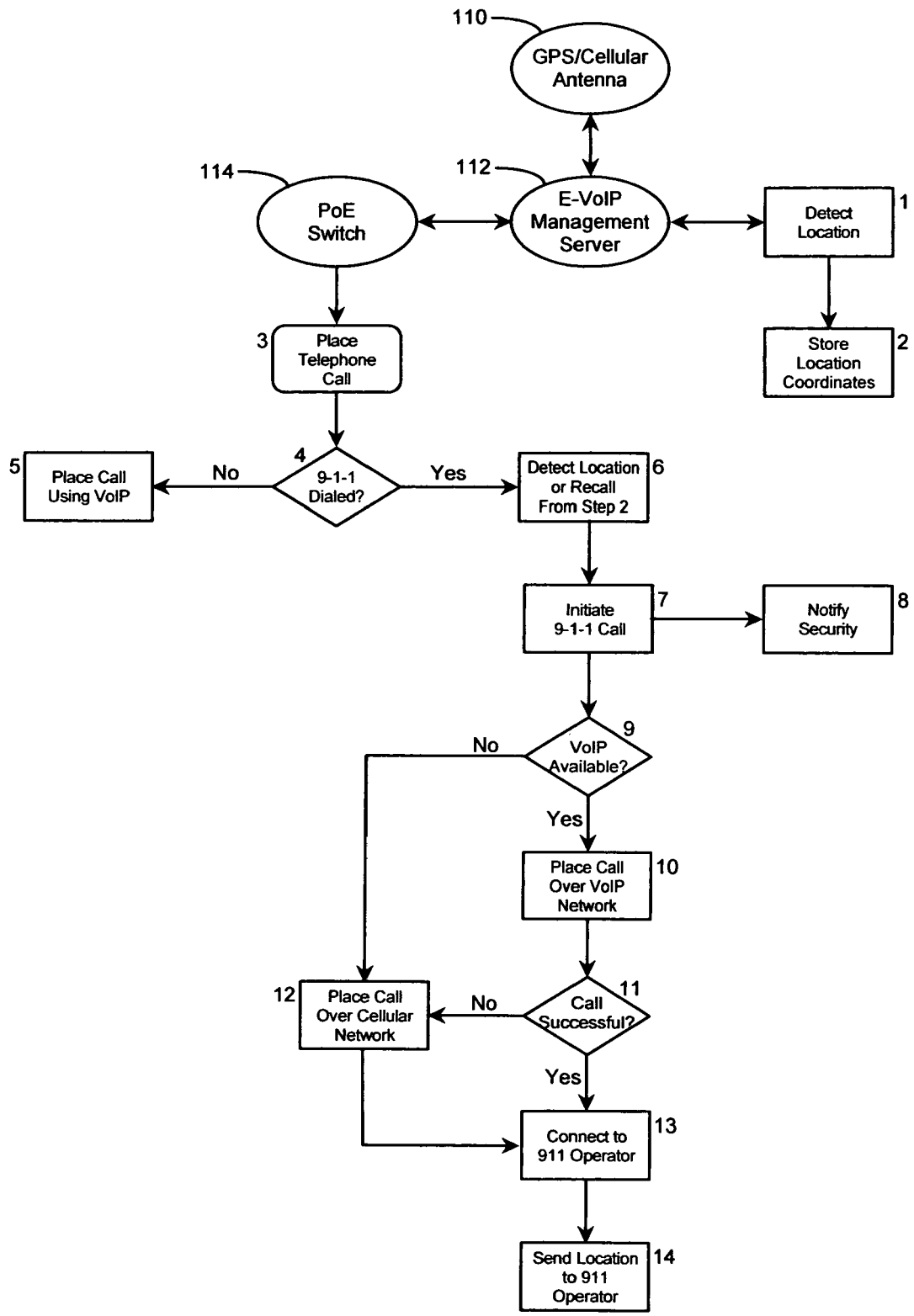
FIG. 2 is a flow chart illustrating an embodiment of an emergency services system of the present invention which is particularly useful for applications involving multiple VoIP users in a single building.

Referring now to FIG. 2, the operation of an embodiment of the E-VoIP system for multiple VoIP users in a single commercial, industrial or residential building will now be discussed. In these types of buildings, the ability of the E-VoIP system to receive the GPS or cellular signals which are used to determine the physical coordinates of the VoIP phone may be hindered by the amount and strength of the materials used in the construction of the buildings. In accordance with the present invention, therefore, the E-VoIP system for multiple VoIP users ideally comprises a number of separate GPS or cellular antennas 110 to determine the physical coordinates of the building and, in one embodiment of the invention, the physical coordinates of the VoIP phone within the building. In a preferred embodiment of the invention, these antennas 110 are positioned where the reception is greatest, such as on the roof of the building.

The E-VoIP system for multiple VoIP users also includes an E-VoIP Management Server 112. The E-VoIP Management Server 112 comprises the components which enable the E-VoIP system to determine the physical coordinates of the building and, in one embodiment of the invention, the location of each VoIP phone within the building. In this embodiment of the invention, the E-VoIP system determines the physical coordinates of the building by triangulating the GPS or cellular signals which are received from the GPS or cellular network over a single antenna 110. In addition, the exact location of each E-VoIP phone within the building is pre-stored in the E-VoIP Management Server 112 by, for example, a system administrator. Thus, when the user dials 9-1-1, the E-VoIP management server is able to communicate both the location of the building and the location of the VoIP phone within the building to the Emergency Services 911 Call Center.

The E-VoIP Management Server 112 may be connected to each VoIP phone via a PoE switch 114. In addition to transmitting data between the E-VoIP Management Server 112 and the VoIP phones, the PoE switch 114 provides operating power to the phones. This feature is important since, in the event of a power failure in all or part of the building, the phones may be powered by an uninterrupted power supply which is connected to the PoE switch 114.

The E-VoIP Management Server 112 may use the POE switch 114 to identify each VoIP phone within the building. In this regard, each VoIP phone may be connected to a corresponding port on the PoE switch 114. In addition, each port on the PoE switch 114 may be manually labeled in the E-VoIP Management Server 112 with certain information concerning its corresponding VoIP phone. This information may include the number of the office in which the VoIP phone is located, the name of the occupant of the office, and any known medical conditions of the occupant, e.g., asthma, heart condition, diabetes, etc. Thus, when a specific VoIP phone accesses the PoE switch 114, the E-VoIP Management Server 112 will be able to immediately identify the physical location of that phone within the building.

In operation, the E-VoIP system will periodically access the GPS or cellular network in order to determine the physical coordinates of the VoIP phone (step 1). As discussed above, this step may involve first determining the physical coordinates of the building via the GPS or cellular network, and then recalling the location of the E-VoIP phone within the building from the E-VoIP Management Server 112. Alternatively, this step may involve determining the physical coordinates of both the building and the VoIP phone via the GPS or cellular network. In this alternative embodiment, the E-VoIP system is configured to operate in the manner described above in connection with FIG. 1 to determine the physical coordinates of the VoIP phone within the building by triangulating the GPS or cellular signals which are transmitted between the phone and a number of the antennas 110. In either case, the E-VoIP system will then store the coordinates of the VoIP phone in the E-VoIP Management Server 112 for later use (step 2), as will be discussed below.

When a caller wishes to make a telephone call, he will dial a desired number into the VoIP phone in the normal fashion (step 3). The E-VoIP system will monitor the numbers entered into the VoIP phone to determine if the number 9-1-1 has been dialed (Step 4). If the number 9-1-1 has not been dialed, the VoIP phone will complete the call in the conventional manner (step 5).

If, however, the E-VoIP system determines that the number 9-1-1 has been dialed, the E-VoIP system will access the GPS or cellular network to obtain the physical coordinates of the VoIP phone in the manner discussed above or, if this operation is unsuccessful, recall the stored physical coordinates from the E-VoIP Management Server 112 (step 6). Alternatively, if the interval at which the E-VoIP system detects the physical coordinates of the phone in step 1 is relatively short, the E-VoIP system may forgo attempting to access the GPS or cellular network to obtain the coordinates and instead simply recall the stored coordinates from the E-VoIP Management Server. Once the E-VoIP system has obtained the physical coordinates of the phone, it will initiate the call to the Emergency Services 911 Call Center (step 7). At this point, the VoIP system may also notify the building security office so that appropriate actions can be taken (step 8).

When placing the call to the Emergency Services 911 Call Center, the E-VoIP system will first determine if the VoIP service to which the VoIP phone is connected is available (step 9). If it is, then the E-VoIP system will route the call over the VoIP network (step 10) and will monitor the call to determine if it has been successfully completed (step 11). If the call is successfully completed over the VoIP network, the E-VoIP system will connect the caller to the Emergency Services 911 Call Center (step 13). However, if the E-VoIP system determines that the VoIP service is unavailable for any reason or that the call was not successfully completed over the VoIP network, the E-VoIP system will complete the call over either the cellular network using the conventional E-911 system or the POTS (step 12).

Once the call is connected to the Emergency Services 911 Call Center (step 13), the E-VoIP system will transmit the pertinent information concerning the VoIP phone to the 911 operator (step 14). This information, which is stored in the E-VoIP Management Server 112, may include the physical coordinates of the building, the street address of the building and the exact location within the building of the VoIP phone from which the call originated. One method for transmitting this information is to include it in a data packet which is routed over the Internet using the QoS protocol.

Figure 3:
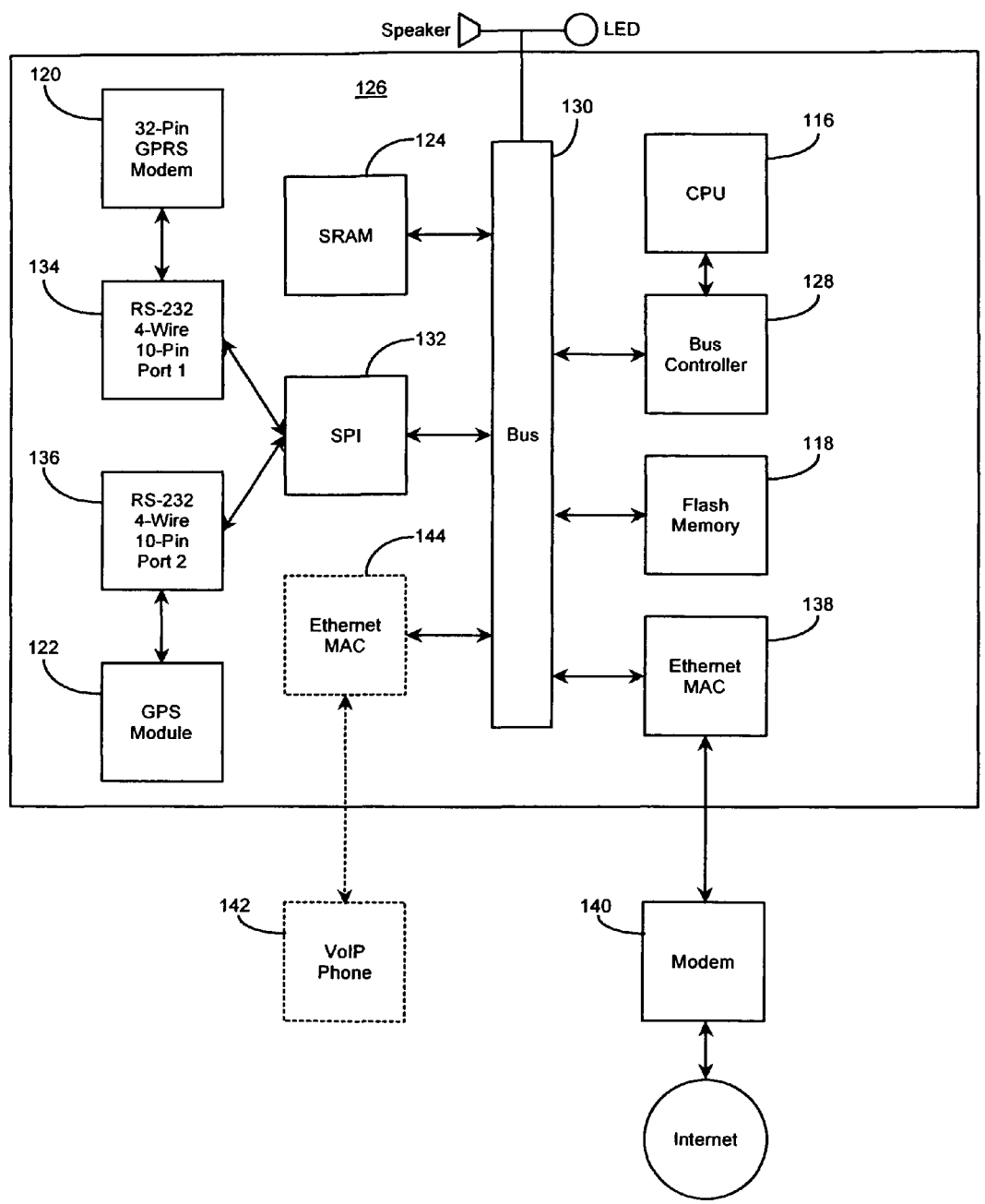
FIG. 3 is a schematic representation of a physical embodiment of the emergency services system of the present invention.

One embodiment of a physical device in which the E-VoIP system of the present invention may be incorporated is illustrated schematically in FIG. 3. As mentioned above, the E-VoIP system may be integrated into a special-built VoIP phone, into a separate device which is connected to a conventional VoIP phone, or into a stand-alone network device such as a host, a server, a switch or a router. With a few minor modifications which will be readily apparent to those of ordinary skill in the art, the following description will apply to any of these applications.

As shown in FIG. 3, the VoIP device comprises a controller 116, a read-only memory device 118, such as an electrically erasable, programmable, read-only memory ("EEPROM"), at least one of a cellular module 120 and a GPS module 122, and preferably also a random access memory device 124, such as a static random access memory ("SRAM"). The controller 116 may comprise a Zilog™ EZ80Acclaim™ Micro Controller Unit, in which event the E-VoIP device may be assembled using a Zilog™ extended Modular Development System board 126. Also, the cellular module 120 may comprise any suitable 32-pin GPRS modem, and the GPS module 122 may comprise, for example, either a Lassen SQ module or a Lassen IQ module, both of which are sold by Trimble Navigation Ltd. of Sunnyvale, Calif.

The controller 116 is connected to the memory device 118 through a conventional bus controller 128 and system bus 130. The memory device 118 stores the operating system for the VoIP device, as well as the physical coordinates determined by the cellular module 120 and/or the GPS module 122 and the associated street address, caller identification and other information which the E-VoIP system transmits to the Emergency Services 911 Call Center.

In an exemplary embodiment of the invention, the controller 116 communicates with the cellular module 120, if present, through the system bus 130, a serial parallel interface ("SPI") 132 and a serial bus 134. The serial bus 134 may comprise, for example, an RS-232 4-wire 10-pin port. Similarly, the controller 116 communicates with the GPS module 122, if present, through the system bus 130, the SPI 132 and a serial bus 136, which may be the same as or similar to the serial bus 134.

In the embodiment of the invention wherein the E-VoIP system is integrated into a VoIP phone, the E-VoIP system may be connected to the internet through a standard Ethernet Media Access Control Module ("MAC") 138, utilizing Ethernet protocol 802.2 and/or 802.3, and a suitable modem 140. The Ethernet MAC 138 and the modem 140 may be the same Ethernet MAC and modem by which the VoIP phone is normally connected to the internet.

In the embodiment of the invention wherein the E-VoIP system comprises a separate device which is connected to a conventional VoIP phone 142 (as shown in phantom in FIG. 3), the phone may be connected to the device through a second Ethernet MAC 144, and the device may in turn be connected to the internet through the Ethernet MAC 138 and the modem 140.

In operation of one embodiment of the E-VoIP device which is adapted for residential use, the E-VoIP device will remain in a "wait" state until the caller activates the VoIP phone. In the wait state, the controller 116 may probe the GPS module 122 at predefined intervals in order to obtain the then-current physical coordinates of the VoIP phone. This data will then be stored in the memory device 118 until needed.

When the caller activates the VoIP phone to make a telephone call, the controller 116 will probe the GPS module 122 in an attempt to determine the current physical coordinates of the phone. If a GPS signal is not available or the controller 116 cannot determine the physical coordinates of the phone, the controller will activate an LED and/or a speaker in order to notify the caller that the coordinates of the E-VoIP phone cannot be determined with the VoIP phone in its current location. The controller 116 will also periodically probe the cellular module 120 to ensure that a connection to a cellular tower is available. As with the GPS signal notification, the controller 116 will activate an LED and/or a speaker to notify the caller if a cellular connection is unavailable.

If the caller dials 9-1-1, the controller 116 will again probe the GPS module 122 to determine the physical coordinates of the VoIP phone. If the physical coordinates are detected, the controller 116 will store these coordinates in the memory device 118. The controller 116 will then probe the Ethernet MAC 138 to determine if this connection is available and that the VoIP phone can connect to the Emergency Services 911 Call Center through the Internet. If the Ethernet connection is not available for any reason, the controller 116 will connect to the cellular E-911 service through the cellular module 120. Alternatively, the controller 116 may bypass the Ethernet connection entirely and connect directly to the E-911 service through the cellular module 120. When the Emergency Services 911 Call Center receives the call, the controller 116 will notify the end user detection system that the call is originating from an IP telephony device and then transmit the last-stored physical coordinates of the VoIP phone to the call center. The Emergency Services 911 Call Center will then resolve these physical coordinates to the appropriate street address and dispatch the Emergency Services to this address as needed.

The E-VoIP system of the present invention can also be used with "soft phones". A soft phone is a software based VoIP phone which uses the computer's internet connection to make and receive telephone calls. In this embodiment of the invention, the E-VoIP system may be integrated into the soft phone, into the computer, or into a separate device which interfaces with the computer. In addition, the computer running the soft phone application can use USB GPS, PCMCIA GPS, Bluetooth GPS, EVDO, RT1x, or other cellular methods to obtain the physical coordinates of the VoIP phone.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

We claim:

1. A method for determining the physical coordinates of a VoIP phone and transmitting the physical coordinates to an emergency services call center or the like, the method comprising:
   determining the physical coordinates of the VoIP phone using signals from a GPS or cellular network;
   placing a call to the emergency services call center with the VoIP phone; and
   automatically transmitting the physical coordinates of the VoIP phone to the emergency services call center;
   wherein the step of placing a call to the emergency services call center comprises determining whether the call can be completed to the emergency services call center over a computer network to which the VoIP phone is connected and, if the call cannot be completed over the computer network, routing the call over a communications network to which the VoIP phone is connected, the communications network being different from the computer network.

2. The method of claim 1, further comprising:
   determining whether the physical coordinates of the VoIP phone can be determined from the GPS or cellular network;
   if the physical coordinates of the VoIP phone cannot be determined from the GPS or cellular network, generating a perceptible signal indicative of the fact that the physical coordinates cannot be determined.

3. The method of claim 1, further comprising:
   monitoring a telephone number which is entered into the VoIP phone;
   comparing the number to an emergency number;
   if the number does not correspond to the emergency number, placing the call to the number; and
   if the number corresponds to the emergency number, placing the call to the emergency services call center.

4. The method of claim 1, wherein the step of determining the physical coordinates of the VoIP phone comprises:
   periodically determining the physical coordinates of the VoIP phone using signals from the GPS or cellular network; and
   storing the physical coordinates in the order in which they are determined.

5. The method of claim 4, further comprising:
   monitoring a telephone number which is entered into the VoIP phone;
   comparing the number to an emergency number;
   if the number corresponds to the emergency number, attempting to determine the physical coordinates of the VoIP phone using signals from the GPS or cellular network;
   if the physical coordinates of the VoIP phone are determined in the attempting step, initiating the call to the emergency services call center; and
   if the physical coordinates of the VoIP phone are not determined in the attempting step, recalling the last determined physical coordinates of the VoIP phone and then initiating the call to the emergency services call center.

6. A method for determining the physical coordinates of a VoIP phone and transmitting the physical coordinates to an emergency services call center or the like, the method comprising:
   determining the physical coordinates of the VoIP phone;
   placing a call to the emergency services call center with the VoIP phone; and
   automatically transmitting the physical coordinates of the VoIP phone to the emergency services call center;
   wherein the step of determining the physical coordinates of the VoIP phone comprises
   determining the physical coordinates of a building in which the VoIP phone is located
   using signals from a GPS or cellular network, and determining the location of the VoIP
   phone within the building; and
   wherein the step of placing a call to the emergency services call center comprises determining whether the call can be completed to the emergency services call center over a computer network to which the VoIP phone is connected and, if the call cannot be completed over the computer network, routing the call over a communications network to which the VoIP phone is connected, the communications network being different from the computer network.

7. The method of claim 6, wherein the step of determining the location of the phone within the building comprises:
   recalling the location of the VoIP phone from a database in which the location has been manually stored.

8. The method of claim 6, wherein the step of determining the location of the phone within the building comprises:
   determining the physical coordinates of the VoIP phone using signals from a GPS or cellular network which are transmitted through a number of antennas proximate the building.

9. A method for identifying the physical location of a VoIP phone or the like to an emergency services call center or the like, the method comprising:
   (a) determining the physical coordinates of the VoIP phone using signals from a GPS or cellular network;
   (b) storing the physical coordinates in the VoIP phone;
   (c) entering digits into the VoIP phone in order to initiate a telephone call;
   (d) monitoring the digits entered into the VoIP phone in step (c);
   (e) if a determination is made in step (d) that the digits 9-1-1 were entered in step (c), attempting to determine the physical coordinates of the VoIP phone using signals from the GPS or cellular network;
   (f) if the attempt to determine the physical coordinates of the VoIP phone in step (e) is unsuccessful, recalling the physical coordinates stored in step (b);

(g) placing the call to the emergency services call center; and (h) automatically transmitting the physical coordinates of the VoIP phone to the emergency services call center.

10. The method of claim 9, wherein the step of placing a call to the emergency services call center comprises:

(i) determining if VoIP service is available to the VoIP phone; and (j) if VoIP service is available, placing the call over the VoIP network.

11. The method of claim 10, further comprising:

(k) if VoIP service is not available, placing the call over the cellular network.

12. A method for identifying the physical location of a VoIP phone or the like to an emergency services call center or the like, the method comprising:

(a) entering digits into the VoIP phone in order to initiate a telephone call;

(b) monitoring the digits entered into the VoIP phone in step (a);

(c) if a determination is made in step (b) that the digits 9-1-1 were entered in step (a), determining the physical coordinates of the VoIP phone using signals from a GPS or cellular network;

(d) determining if VoIP service is available to the VoIP phone;

(e) if a determination is made in step (d) that VoIP service is available, placing the call over the VoIP network;

(f) if a determination is made in step (d) that VoIP service is not available, placing the call over the cellular network: and (g) automatically transmitting the physical coordinates of the VoIP phone to the emergency services call center.

13. The method of claim 1, wherein the communications network is a cellular network.

14. The method of claim 1, further comprising storing at least one of the name and medical condition of a person to which the VoIP phone is associated and automatically transmitting the name and/or medical condition to the emergency services call center along with the physical coordinates of the VoIP phone.

15. The method of claim 9, wherein the step of determining the physical coordinates of the VoIP phone in step (a) comprises determining the physical coordinates of the VoIP phone using signals from one of the GPS network and the cellular network and, if that network is not available, determining the physical coordinates of the VoIP phone using signals from the other of the GPS network and the cellular network.

16. The method of claim 9, wherein the step of attempting to determine the physical coordinates of the VoIP phone in step (e) comprises attempting to determine the physical coordinates of the VoIP phone using signals from one of the GPS network and the cellular network and, if that network is not available, attempting to determine the physical coordinates of the VoIP phone using signals from the other of the GPS network and the cellular network.

17. The method of claim 12, wherein the step of determining the physical coordinates of the VoIP phone in step (c) comprises using signals from one of the GPS network and the cellular network and, if that network is not available, determining the physical coordinates of the VoIP phone using signals from the other of the GPS network and the cellular network.

18. A method for determining the physical coordinates of a VoIP phone and transmitting the physical coordinates to an emergency services call center or the like, the method comprising:

determining the physical coordinates of the VoIP phone using signals from a GPS or cellular network;

placing a call to the emergency services call center with the VoIP phone; and automatically transmitting the physical coordinates of the VoIP phone to the emergency services call center;

wherein the step of automatically transmitting the physical coordinates of the VoIP phone comprises including the physical coordinates in a data packet which is transmitted over the internet using a quality of service (QoS) protocol; and wherein the step of placing a call to the emergency services call center comprises determining whether the call can be completed to the emergency services call center over a computer network to which the VoIP phone is connected and, if the call cannot be completed over the computer network, routing the call over a communications network to which the VoIP phone is connected, the communications network being different from the computer network.

* * * * *